United States Patent [19]

Handel et al.

[11] Patent Number: 4,585,085

[45] Date of Patent: Apr. 29, 1986

[54] ELECTRIC WHEEL-DRIVE FOR MOTOR VEHICLES, IN PARTICULAR FOR NONDESTRUCTIVE HYBRIDIZATION OF AUTOMOBILES

[76] Inventors: Peter H. Handel, Physics Department, University of Missouri, St. Louis, Mo. 63121; Peter Handel, Hans Stiessberger Str. 6, 8013 Haar, Fed. Rep. of Germany

[21] Appl. No.: 294,725

[22] Filed: Aug. 20, 1981

[51] Int. Cl.$^4$ ............................................. B60K 7/00
[52] U.S. Cl. ................................ 180/65.2; 180/65.8; 310/68 R; 318/254
[58] Field of Search ............... 180/65 F, 65 E, 65 A, 180/65 R, 65 C, 60, 242, 243, 65.2, 65.5, 65.8, 65.1, 165; 310/156, 68 R, DIG. 3, 67, 178; 290/45, 50; 318/139, 254 A

[56] References Cited

U.S. PATENT DOCUMENTS

| | | | |
|---|---|---|---|
| 2,348,053 | 5/1944 | Bowker | 180/65 F |
| 3,265,147 | 8/1966 | Coordes | 180/65 F |
| 3,566,165 | 2/1971 | Lohr | 310/67 |
| 3,586,894 | 6/1971 | Mueller | 310/178 |
| 3,616,761 | 11/1971 | Valls | 310/178 |
| 3,792,742 | 2/1974 | Mager | 180/65 F |
| 3,906,267 | 9/1975 | Coupin | 310/68 R |
| 4,021,690 | 5/1977 | Burton | 180/68.5 |
| 4,097,758 | 6/1978 | Jenkins | 310/178 |
| 4,187,441 | 2/1980 | Oney | 310/112 |
| 4,283,664 | 8/1981 | Ebert | 318/254 A |
| 4,311,933 | 1/1982 | Riggs et al. | 310/156 |
| 4,354,126 | 10/1982 | Yates | 310/156 |

FOREIGN PATENT DOCUMENTS

| | | | |
|---|---|---|---|
| 2802753 | 7/1979 | Fed. Rep. of Germany | 180/65 R |
| 109103 | 8/1980 | Japan | 180/65.8 |

*Primary Examiner*—David M. Mitchell
*Attorney, Agent, or Firm*—Polster, Polster and Lucchesi

[57] ABSTRACT

An electric wheel-drive for motor vehicles, particularly automobiles with internal combustion engine, which can be installed nondestructively-reversibly in place of the brakes, with brushless, polyphasic, electronically speed-controlled electric motors individually attached to the wheels. The electric motor is a homopolar multiple-airgap axial-field motor whose rotor (1) replaces the wheeldrum and brake-disk, and whose stator (2) replaces the brake-shoes, brake-pads, and brake splashshield plate of at least two wheels of a pair, in a conventional automobile with internal combustion engine. An electronic control system is included for the control of the axial-field motor during propulsion and braking. This electric wheel-drive allows for a fast, uncomplicated, and inexpensive hybridization of the car without modifications of the wheels, or the axle, or of other parts of the car, thereby providing the car with second, independent, propulsion system.

9 Claims, 12 Drawing Figures

FIG. 6
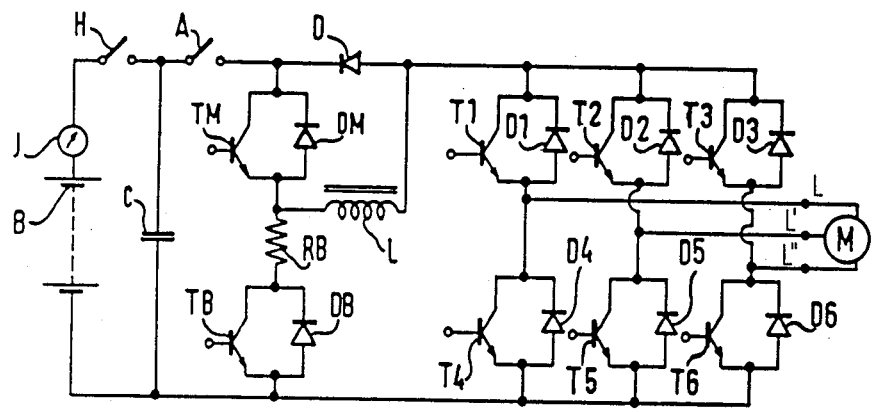
FIG. 7
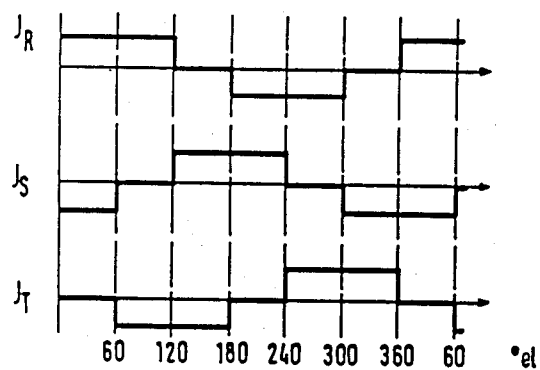
FIG. 8
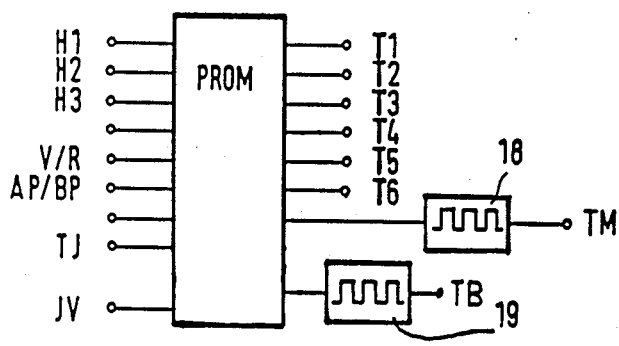
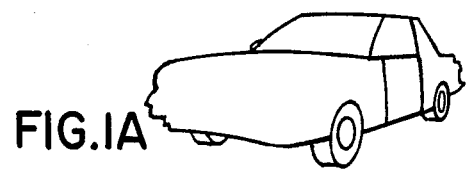
FIG. 1A

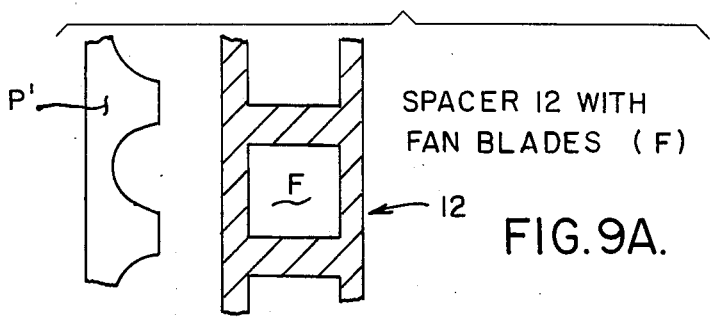
FIG. 9A.
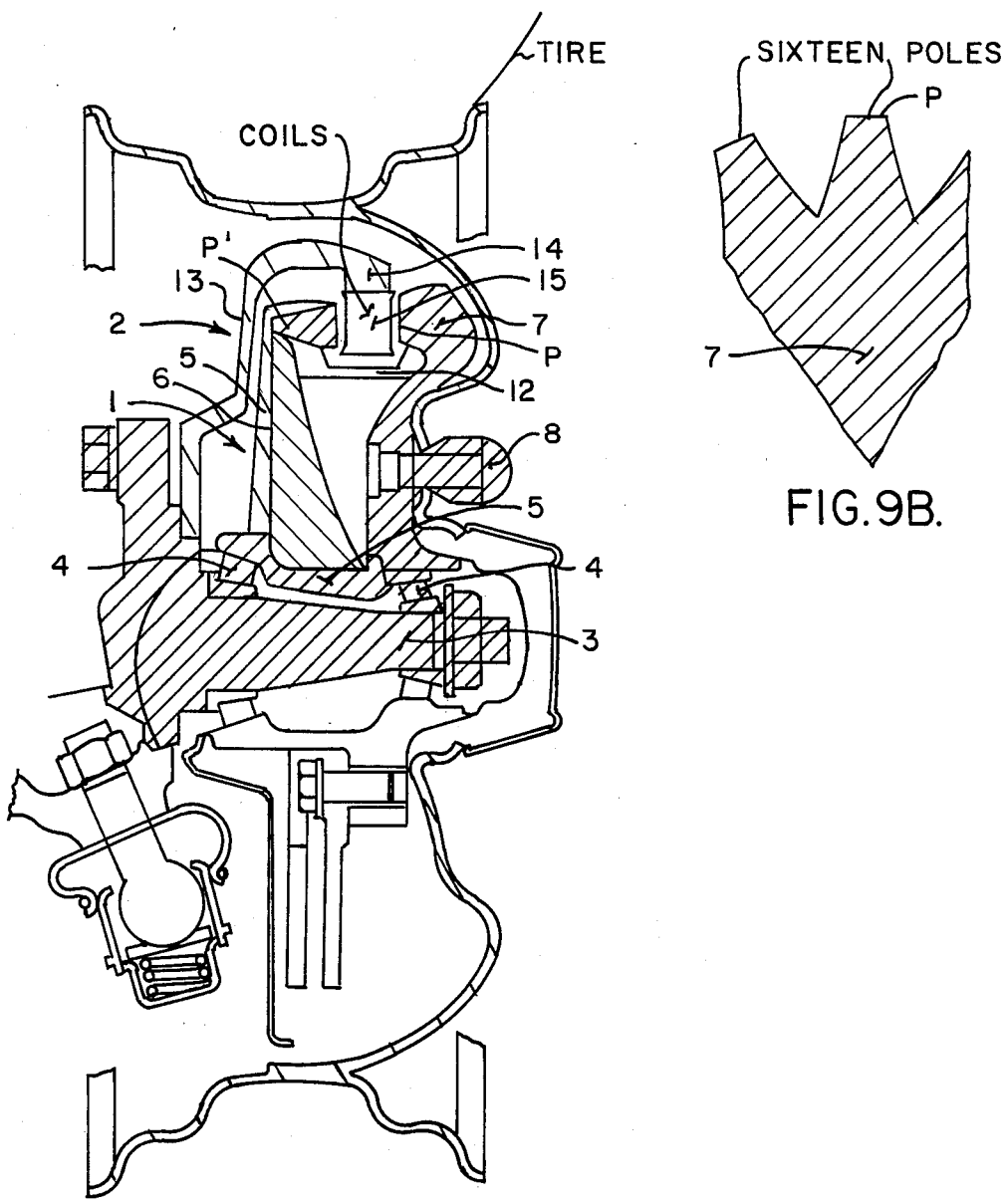
FIG. 9B.
FIG. 9.

ELECTRIC WHEEL-DRIVE FOR MOTOR VEHICLES, IN PARTICULAR FOR NONDESTRUCTIVE HYBRIDIZATION OF AUTOMOBILES

BACKGROUND OF THE INVENTION

1. Field of the Invention

The present invention relates to an electric wheel-drive for motor vehicles, especially for passenger cars with internal combustion engine, with individual brushless polyphasic electric motors attached to the wheels and electronically controlled in frequency.

2. Purpose of the Invention

Aim of the present invention is the simple, inexpensive and reliable, nondestructive, mass-hybridization of motor vehicles with internal combustion engine, in particular automobiles, through the additional installation of 2 electric wheel-drives without modification of the wheels, the axle, or of other parts of the car, the drives being energized by a battery which is included for this purpose, resulting in two independent propulsion systems.

3. Description of the Prior Art

In the Journal "Elektrotechnik und Maschinenbau" (Austria) No. 8 (August 1976) pp. 335–341 a special electric streetcar was disclosed with large-diameter electric wheel-hub motors on two individual very large wheels at the middle of the streetcar, one small support wheel in front, and one in the back. The propulsion is exclusively electric, the motors being fed by a generator driven in turn by an internal combustion engine, with a battery also included. This system is not suitable for a nondestructive mass-hybridization of conventional cars.

Through the British patent GB-PS1246354 a motor vehicle with wheels driven in principle by electric motors was disclosed. The propulsion is exclusively electric, and the electric motors are fed by a generator driven by a gas turbine, or by a battery. This system also does not provide any suggestions for a nondestructive mass-hybridization of conventional cars in terms of two independent propulsion systems.

In the disclosure DE-OS 2802753 (F.R. Germany) a heteropolar synchronous motor for vehicle propulsion was presented. Neither can a suggestion for the problem of nondestructive mass-hybridization of motor vehicles with internal combustion engine be found in DE-OS 2802753 nor can this be accomplished with the synchronous motor described there.

Taking into account the considerable insecurity and fluctuation in the gasoline supply, as well as polution control, energy conservation, and the large waste of fuel on the daily short distance trips from home to work, a reversible, non-destructive means of transforming the car into a gasoline-electric (parallel-type) hybrid is definitely needed today, both at the level of the car manufacturer and at the dealer shop ("while you wait").

SUMMARY OF THE INVENTION

Accordingly, the task underlying the invention, and the object of the invention, is to create a wheel-drive of the kind described in the beginning, which is simple and robust in operation, easy and fast to install, transferable among similar cars, and which reduces gasoline consumption, even to zero for short-distance traffic corresponding to the limitations in battery capacity.

This task is performed by the invention through homopolar multiple-airgap axial field motors whose rotors replace the drum of the brake, or the disks if disk brakes were present, and whose stator replaces the brake-shoes and the splash plates of at least two wheels with the same axle of a conventional car, and through the inclusion of an electronic control system for the propulsion and braking operation modes of the motors.

Such an axial-field motor is robust and can be installed very fast. The axial-field motors replacing two of the brakes, and the control are put in in very short time and connected with the battery. The transformation can be reversed at any time. The car receives an independent second propulsion system according to this invention. All-wheel traction, useful in snow conditions, can be obtained by electrifying the non-motor wheels.

The rotor of the axial-field motor is appropriately composed of an axially magnetized or nonmagnetic supporting tube located on bearings on the axle, of a tubular permanent magnet of high-energy-density material with essentially axial magnetization clad on it, of frontally adjoining forged iron disks of which the one located at the external side of the wheel carries the screws holding the wheel, and of pole-rings put on the permanent magnet peripherically and comprising both stars of support arms and axially-magnetized pole-pieces of high-energy-density material at the free ends of the support arms. The tubular permanent magnet may be composed of hollow-cylindrical sectors, and/or annular disks.

The stator of the axial-field motor is composed best of a pot-shaped casing and of support-elements fixed inside, on the casing, and extending inward, which carry flat ring-shaped coils located in the air-gaps between the pole-pieces. This yields a particularly compact and stable body.

The permanent magnet and the pole pieces are suitably consisting of a samarium-cobalt alloy.

The ring-shaped coils are profitably made of lamellar windings, or they are bobbin-wound coils of ribbon conductor. In a particularly advantageous embodiment the axial-field motor has five pole rings and six airgaps. The number of pole rings (and airgaps) is determined for each vehicle by the space available on the axle. The motor has preferably eight poles and a tri-phase winding.

Hall-effect switches are suitably located in the motor for control. In the case of an eight-pole axial-field motor with balanced three-phase winding, the Hall-effect switches are mounted with an angle of 15° between them on the stator.

The electronic control system is profitably connected for the regulation of the motor in three modes of operation: propulsion, regenerative braking, and resistive braking.

Furthermore, the control preferably contains a programmable read only memory (PROM) which receives various driving, state of the system, and security signals and emits control signals.

In an advantageous embodiment the electronic control is constructed with silicon controlled rectifiers (SCR).

The electronic control can be appropriately switched on with a 3 position switch for forward operation, exclusively braking, and reverse operation of the axial-field motors.

BRIEF DESCRIPTION OF THE DRAWINGS

The invention is further explained below in terms of examples of embodiment with the help of drawings. In the drawings:

FIG. 1A is a view in perspective of one illustrative motor vehicle in which the motor of FIG. 1 finds application.

FIG. 6 is the scheme of a circuit with silicon controlled rectifiers (SCR) the control of the axial-field motor in FIG. 1;

FIG. 7 is a schematic representation of the currents in the three phases of the motor in FIG. 1;

FIG. 8 is a representation of the digital processor controlling the scheme in FIG. 6.

DESCRIPTION OF THE PREFERRED EMBODIMENT

Figure 1:
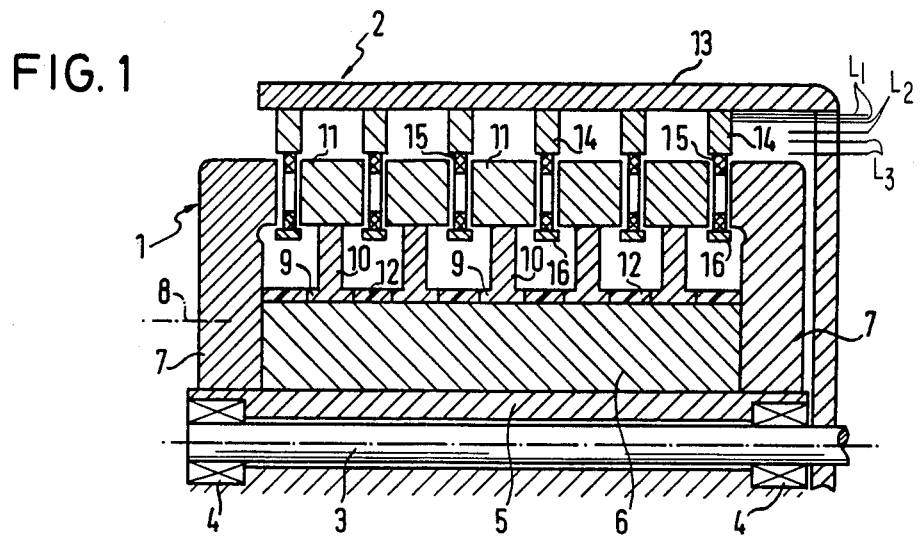
FIG. 1 is a schematic axial section view of an axial field motor according to the invention.
Figure 2:
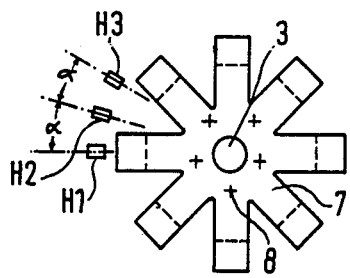
FIG. 2 is a frontal view of the rotor of the motor in FIG. 1 at a smaller scale, with the Hall effect switches pointed out.
Figure 3:
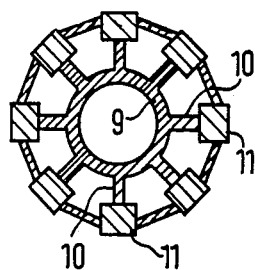
FIG. 3 is a schematic cross-section through a star of support arms with pole-pieces of the motor in FIG. 1.

The brushless homopolar axial-field motor represented in FIGS. 1 to 3 is triphasic, has eight poles, and exhibits six about 8 mm wide airgaps. It comprises a rotor 1 and a stator 2, the stator 2 being connected to a source of electrical energy by suitable lead wires L, L', and L" as shown in FIG. 1. The rotor 1 replaces the brake drum or brake disk, and the stator 2 replaces the brake shoe assembly or brake pads together with the brake back plate or brake splash shield, without changes in the wheel-axle 3.

The rotor 1 contains an axially magnetized, or non-magnetic, support tube 5. In the case of motor-driven wheels, the rotor 1 is solid with the (rotating) axle of the wheel, and the bearings 4 are missing. A tubular permanent magnet 6 of highest energy density and with predominantly axial magnetization is set on the support tube 5. The permanent magnet 6 may be composed of annular disks or annular sectors. It is suitably composed of a samarium-cobalt (or similar) material with energy density of $2.10^5$ J/m$^3$ or higher. Forged iron annular-stellar disks 7, for example, 1.9 cm thick, adjoin the permanent magnet 6 frontally. The forged iron disk facing the external side of the wheel carries the screws 8 holding the wheel, as indicated on FIGS. 1 and 2. The predominantly axially magnetized permanent magnet 6 can exhibit, towards its ends adjoining the forged iron disks, a gradually increased radial component of the magnetization, pointing outward.

Five pole rings 9 shaped in the form of stars of support arms with axially magnetized pole-pieces 11 of high energy density attached to the free ends of the support arms 10, are set on the permanent magnet 6. The pole pieces 11 can also be made of samarium-cobalt material, or, e.g., of an iron-aluminum-nickel-cobalt alloy ($5.10^4$ J/m$^3$). Between the pole-rings 9, light metal plastic or poured resin rings can be applied as additional fasteners. The support arms 10 themselves are made of non-magnetic material and are slightly slanted to provide ventilation.

The stator 2 of the axial-field motor is composed of a pot-shaped casing 13 fastened on the wheel-axle and steering knuckle. Some openings are present on the bottom of the pot-shaped casing for ventilation and cooling. In the case of motor wheels the casing rests on the bearings which support the (rotating) axle. Six ring-shaped support elements 14, each of them carrying a flat ring-shaped coil 15 protruding into the airgap between the pole-pieces 11, are fixed in the case, extending inwards. On the inner side of the ring-shaped coils there are support rings 16. The support elements 14 and the support rings 16 are fastened to the corresponding flat ring-shaped coil 15 e.g., by pouring a hardening agent.

Figure 4:
FIG. 4 is a lamellar (ribbon) winding of the ring-coils in FIG. 1.

The ring-shaped bobbin-wound armature coil 15 can be made suitably of lamellar windings 17 as shown in FIG. 4, with the use of ribbon conductor. Each of the six ring-shaped coils 15 contains three phases spatially displaced by 15° from each other and connected for all six ring-shaped coils in series such that only three power leads are leaving the motor. The winding is connected preferably in star.

The axial-field motor is homopolar, since the lines of force are passing through the pole-pieces 11 everywhere in the same direction. The magnetic flux density in the airgap is about 0.8 Tests.

For a current of 250A the motor develops a torque of about 330 Nm. A power of about 20 KW is thereby obtained at a frequency of 600 rotations/m which corresponds to an applied voltage of 100 V. Usually there would be two axial-field motors installed in any car at the otherwise not propelled wheels, yielding 40 KW together. For a small car weighing 1000 Kg (including the batteries), with a diameter of the wheels of 0.5 m the speed developed is then about 100 km/h or 62.5 m.p.h. Due to the limited available torque, the highest slope accessible to the car without use of the internal combustion engine is about 15%. The acceleration time from rest to 50 km/h (31 m.p.h.) is about 8 s.

A control system and a battery are needed for the operation of the axial-field motor. The control system is constructed with solid-state components and performs two main functions.

Figure 5:
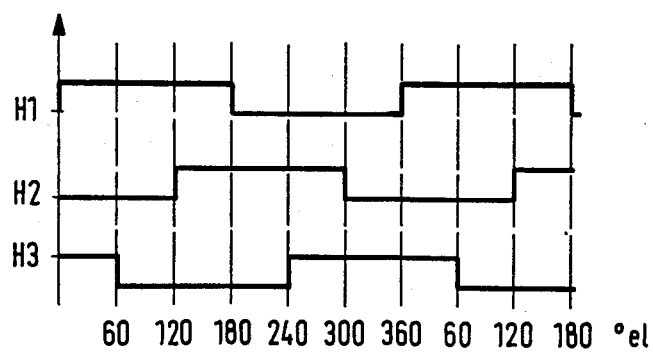
FIG. 5 is a representation of the switching sequence and output signals of the Hall switches in FIG. 2.

(a) Switching the current for the three phases in the right sequence, such that all radially oriented conductors in the three-phase winding contribute positively to the torque while they are in the airgap. This switching process is triggered by three Hall-effect switches H1,H2,H3 (FIG. 2) placed on the stator 2 in spatial intervals of $\alpha = 15°$ in order to sense the position of the rotor. The switching cycle of the Hall switches is represented in FIG. 5.

(b) Control of the current absorbed by the motor and of the torque generated in the motor. The torque is proportional to the current.

The battery contains, e.g., 18 lead or iron-nickel batteries of 6 V, or the same number of 12 V-batteries, the first choice being particularly favorable for the case of 120 V power outlets being used with a transformerless charger for overnight recharging, or used without charger, by simply switching from the motor M in FIG. 6 to the power outlet (not shown). During driving or regenerative braking the batteries can be switched automatically, depending on the frequency of the signals given by the Hall switches $H_1$–$H_3$ to the PROM, i.e., depending both on motor speed and on whether the gas pedal or the brake pedal is depressed, in six parallel groups of three batteries in series (18/36 V), in three parallel groups of six batteries in series (36/72 V), in two parallel groups of nine batteries in series, or all in series (108/215 V). The batteries, located for instance in the trunk of the car, are weighing at this time about 300 kg and provide the car with an action radius of about 80 km without the use of the internal combustion engine. The engine is to be used for longer trips. With the battery taken out, only the resistive braking mode of operation can be used. Removal of the battery is recommended for extended, or trans-continental trips.

FIG. 6 shows a circuit in the power control, which allows for driving, regenerative braking, and resistive braking operation of the axial-field motor. The circuit is connected through an ammeter I and a main switch H to the battery. The capacitor C is parallel to the entrance and reduces the ripple. Then a second switch A follows. Parallel to the capacitor C is the series connection of a transistor-diode chopper combination TM, DM, a braking resistor and a transistor-diode chopper combination TB, DB. The transistor-diode chopper combination TM, DM is for current limitation and control in the driving mode, and the chopper TB,DB is for current limitation and control in the resistive braking mode. Parallel to the chopper TM,DM there is an inductor L and a safety-diode D which eliminates possible high voltage transients.

After the circuit mentioned above, in FIG. 6 there follows a bridge of six transistor-diode combinations T1D1,T2D2,T3D3,T4D4,T5D5 and T6D6 which are connected with the motor M. These six transistor-diode combinations are switched by the Hall-effect switches (through the PROM) and generate triphasic current. During regenerative braking the six diodes D1, D2, D3, D4, D5 and D6 work as a rectifier bridge and charge the battery B. The transistors TM, TB, and T1–T6 are preferably silicon controlled rectifiers (SCR). If n motors are present, this (bridge) part of the controller will be duplicated n times in parallel.

A suitable choice of the currents $J_R J_S$ and $J_T$ sent to the motor in the three phases in FIG. 5 is shown in FIG. 7.

The steering of the control shown in FIG. 6 by the Hall switches H1, H2 and H3, by the gas and brake pedals of the car, and by the respective level of the motor current is performed advantageously through a PROM. The connections of such a PROM are presented in FIG. 8. The PROM receives signals from the Hall-switches H1, H2 and H3, a signal V/R corresponding to the choice of forward or reverse driving, a signal AP/BP from a gas pedal (accelerator) potentiometer or a brake pedal potentiometer, a signal TJ indicating possible thermal overloads of the motor M and the transistor TM, as well as a current level signal JV. From the output of the PROM leave the control signals for the transistors T1 to T6. Two other signals from the PROM control two oscillant circuits which determine the width and frequency of the rectangular opening-pulses for the transistor-diode chopper combinations TM and TB, respectively. In addition, the PROM emits several battery-switching signals. Due to the most likely presence of two motors (with independent phases) the upper part of the PROM in FIG. 8, and the connections H1–H3, T1–T6, and TJ will be duplicated in practice. This duplication is trivial and has been omitted in this text for the sake of simplicity.

In the electric operation mode the driver controls the vehicle with the help of the gas pedal, of the brake pedal, and of the three-position switch for forward driving, exclusively (resistive, i.e., dynamical) braking, and reverse driving. From the three-position switch the signal V/R originates, depending on which position the switch is in. Braking is possible in all three positions, resistive (i.e., dynamical) braking even when the main switch H is open. The other parts of the control system are set in operation by closing the main switch H. This is suitably done in the "Garage" position of the ignition lock (which does not lock the steering wheel, but has the ignition off).

In addition to their normal function, the gas and brake pedals are each connected mechanically with a potentiometer which also has a contact at the beginning of its way in the case of the gas pedal and a contact at the middle of its way in the case of the brake pedal. With the main switch H closed, if the gas pedal is depressed the switch A (FIG. 6) and the gas pedal contact arm (which switches the AP/BP signal) will close themselves after a short way of the pedal. In this position the gas potentiometer has the largest value of its resistance, and consequently the PROM opens the transistor TM only about 5% of the time (creep speed, to be adjusted at the oscillant circuit next to the PROM). If the gas pedal is further depressed, the width and repetition frequency of the rectangular "on"-signals finally increase, e.g. up to $3.10^{-3}$ s and 300 Hz, respectively and the transistor TM will be open for about 90% of the time. At this point the transistor TM may be short-circuited by a direct switch (not shown on FIG. 6). The control can also be performed by making the gas potentiometer (or variable inductance), part of an oscillant circuit whose frequency it determines, and which in turn determines the repetition frequency and width of the "on"-signals for the transistor TM. The "on"-signals are further limited in width and frequency by thermal overload signals T1 which act on the oscillant circuit and are coming from the stator-windings of the axial-field motors and from the support of the transistor TM.

If the gas pedal is left free, the car moves freely by virtue of its inertia. If the brake pedal is depressed, after a very short way a contact is closed switching the battery (through the PROM) to the series-parallel combination corresponding to the respective motor speed, similar to what happens if the gas pedal is depressed, but with a slightly different adjustment. Simultaneously, the switch A closes itself. Thereby the battery will be charged through the six diodes D1 to D6 in regenerative braking. At very low speeds, at which the battery can no longer be switched down, the regenerative braking action vanishes gradually. If the brake pedal is further depressed, both the hydraulic brakes (at the non-electric wheels) and resistive (dynamical) braking are initiated beyond a certain position S of the pedal. Resistive braking occurs, similar to the electric action of the gas pedal, by the closing of the brake potentiometer contact in the position S. At this initial position, somewhat before the middle of the pedal way, the brake potentiometer (or variable inductance) has its largest value, and therefore the PROM opens the transistor TB only for about 5% of the time. Resistive braking occurs with heat being generated mainly in the resistor $R_B$, but also in the motors M, the transistor TB and in the wiring in parallel, i.e., additionally to the hydraulic brakes. The energy appearing in the case of stronger braking action is therefore distributed among battery, brake pads, and the resistor $R_B$ connected in series with the chopper combination TB, DB in FIG. 6.

The control of the resistive braking is again accomplished, e.g., by making the brake potentiometer (or variable inductance) part of an oscillant circuit connected to the PROM, thereby controlling the frequency of the circuit, and indirectly the frequency and width of the "on" signals for TB. However, these signals are not limited additionally by thermal overload signals from the motors M and the support of the transistor TB, but these thermal overload signals activate only a red brake overload warning light in view of the driver on the dashboard. The ammeter I, with red maximal current marks on both sides, indicates the battery discharge current by deflection to the right and the charging current by deflection to the left in regenerative braking.

The series-parallel battery-switching is controlled by the PROM both in driving and regenerative braking on the basis of the motor speed information derived from the Hall switches H1, H2 and H3, also taking into account the signal AP/BP.

A different shaping of the axial-field motor, e.g. as disk motor, is considered as a poorer execution of the invention. All other modifications of mechanical or electrical nature within the framework of the claims are included in the protected domain of the invention.

Obviously, numerous modifications and variations of the present invention are possible in light of the above teachings. It is, therefore, to be understood that within the scope of the appended claims, the invention may be practiced otherwise than specifically described herein.

What is claimed as new and desired to be secured by Letters Patent of the United States is:

1. In a motor vehicle including an internal combustion engine, four wheels mounted for rotation to said vehicle, each of said wheels having an axle, a first pair of said wheels being operatively connected to said internal combustion engine so as to be driven thereby, a pair of bearings mounted on said axle, a support tube mounted for rotation to said bearings, the improvement comprising means for providing an electric drive for the non-internal combustion engine driven pair of said wheels, said electric drive means comprising a homopolar axial field motor including a stator and a rotor, said stator forming a brake shoe and said rotor forming one of a brake drum and disc for respective ones of said non-internal combustion engine driven wheel pair, a permanent magnet of high energy density material mounted to said support tube and rotatable therewith, at least one iron disc mounted on said support tube in close proximity to said permanent magnet, said stator including an enclosure, a plurality of support elements mounted to said enclosure and extending radially inwardly therefrom, and a plurality of coils mounted on said support elements in spaced relationship to one another, a plurality of pole rings mounted on said permanent magnet, said pole rings including a plurality of radially extending support arms, and a plurality of axially magnetized pole pieces, said pole pieces being constructed of high energy density material, respective ones of said pole pieces being positioned between respective pairs of said coil plurality.

2. The improvement of claim 1 wherein the permanent magnet of said rotor is constructed from a samarium-cobalt material of high magnetic energy density.

3. The improvement of claim 2 wherein said coils are constructed from a ribbon conductor.

4. The improvement of claim 3 wherein the winding of said axial-field motor is a three-phase winding and said rotor includes eight pole pieces.

5. The improvement of claim 4 further including means for sensing the position of said rotor.

6. The improvement of claim 5 wherein said position sensing means comprise Hall-effect switches.

7. The improvement of claim 6 wherein said control means includes a programmable read-only memory operatively connected to provide gate control signals to a plurality of solid state devices for applying electrical energy to said motor.

8. The improvement of claim 7 wherein said solid state devices are silicon-controlled rectifiers.

9. In a wheeled vehicle including an internal combustion engine for providing drive means to a first set of wheels, each of said wheels including one of a wheel drum and disc; and a brake shoe assembly, the improvement comprising means for converting the non-driven wheels to electrically driven wheels, said converting means including respectively for each wheel of said non-internal combustion engine driven wheel set, an axial field motor, said motor including a rotor, means for rotatably mounting said rotor, said rotor replacing one of said wheel drum and disc in said second set of non-driven wheels, at least one magnet magnetized in both in axial and radial direction, and a stator assembly, said stator assembly adapted to replace the brake shoe assembly of said non-driven wheels, said stator assembly including an enclosure, a plurality of support elements mounted to said enclosure and extending radially inwardly therefrom, and a plurality of coils mounted on said support elements in spaced relationship to one another, said rotor including a plurality of pole rings mounted for rotation with said permanent magnet, said pole rings including a plurality of radially extending support arms, and a plurality of axially magnetized pole pieces, respective ones of said pole pieces being positioned between respective pairs of said coil plurality.

* * * * *